United States Patent [19]

Cox et al.

[11] Patent Number: 5,058,000
[45] Date of Patent: Oct. 15, 1991

[54] SYSTEM FOR ACCESSING REMOTE HETEROGENEOUS DATABASE INCLUDING FORMATTING RETRIEVED DATA INTO APPLICATIONS PROGRAM FORMAT

[75] Inventors: Landon Cox, Del-Mar, Calif.; Wayne Kovsky, Millis; Marie Mastaj, Milford, both of Mass.

[73] Assignee: Prime Computer, Inc., Natick, Mass.

[21] Appl. No.: 368,159

[22] Filed: Jun. 15, 1989

Related U.S. Application Data

[63] Continuation of Ser. No. 68,849, Jun. 30, 1987, abandoned.

[51] Int. Cl.$^5$ .................. G06F 12/06; G06F 13/38; G06F 15/16; G06F 15/40
[52] U.S. Cl. .................. 364/200; 364/239.3; 364/260.1; 364/260.9; 364/261.2; 364/283.1; 364/939.1; 364/940; 364/962; 364/963.1; 364/963.4; 364/963.2; 364/974; 364/975.1
[58] Field of Search ... 364/200 MS File, 900 MS File

[56] References Cited

U.S. PATENT DOCUMENTS

| | | | |
|---|---|---|---|
| 4,604,686 | 8/1986 | Reiter et al. | 364/200 |
| 4,627,019 | 12/1986 | Ng | 364/900 |
| 4,630,196 | 12/1986 | Bednar et al. | 364/200 |
| 4,644,471 | 2/1987 | Kojima et al. | 364/300 |
| 4,674,066 | 6/1987 | Kucera | 364/900 |
| 4,692,858 | 9/1987 | Redford et al. | 364/200 |
| 4,751,635 | 6/1988 | Kuret | 364/200 |
| 4,754,326 | 6/1988 | Kram et al. | 364/900 |
| 4,805,134 | 2/1989 | Calo et al. | 364/900 |

Primary Examiner—Archie E. Williams, Jr.
Assistant Examiner—Achni Mohamet
Attorney, Agent, or Firm—Wolf, Greenfield & Sacks

[57] ABSTRACT

An improved method for access to data from a remote computer and an improved method for accessing remote heterogeneous data bases. The method includes a personal computer having an application program for processing data by keyboard input that operates on a local applications data base having files with a first file structure. A remote host computer accesses data in remote files having a second file structure. A preselected keystroke of the first computer modifies the data accession program of the remote computer to reformat retrieved data in the format of the personal computer applications program before transmission back to the personal computer, so that the personal computer resident portions of the program require no information as to where the requested data is located or what the host computer file structure is.

2 Claims, 2 Drawing Sheets

SYSTEM FOR ACCESSING REMOTE HETEROGENEOUS DATABASE INCLUDING FORMATTING RETRIEVED DATA INTO APPLICATIONS PROGRAM FORMAT

This application is a continuation of application Ser. No. 07/068,849, filed Jun. 30, 1987, now abandoned.

BACKGROUND OF THE INVENTION

Many modern computer systems include a plurality of personal computers (PC's) which each may run a local applications program working with a local database, and a remote central computer which may, for example, be a mini computer or a main frame computer capable of accessing and processing a database significantly larger than that accomodated by the PC's. The remote host runs different programs including data retrieval programs employing file formats and database accessing protocols quite different form the PC programs.

In such systems the PC's running applications programs often require data from the central host. Acquiring such data in the prior art has required running a special data transfer program in which the user requests, usually through a menu driven interface, information from the host. This technique requires the user to exit his applications program, load the data transfer program, and perform a multi-step procedure to acquire the remote data and place it in a form which will be accessible through the applications program.

In addition to such data transfer programs, there are certain utility programs which may be characterized as keyboard monitor popup programs. In these programs, a specially programmed function key or command is used to call up a utility program. A "window" displays appropriate menus, and guides the user in running and closing down the program; the PC then returns to its applications program. *Sidekick* is a prominent example of such a utility program. Each of the foregoing approaches to accessing remote files requires the user to effectively operate with a different program and a separate set of commands from that of the basic applications program.

SUMMARY AND OBJECTS OF THE INVENTION

It is an object of the invention to provide an improved method and device for accessing data from a remote computer.

It is another object of the invention to provide an improved method and device for accessing remote heterogeneous databases.

It is a further object of the invention to provide such a method or device which is user transparent and employs the normal commands of a PC applications program.

These and other features of the invention are obtained in a computer system of the type having one or more PC's each having an applications program for processing data by keyboard entered applications commands operative on an applications database having files with a first file structure, and a remote host computer configured to access data in remote files having a second file structure. A preselected keystroke of the first computer is programmed to initiate an interrupt, causing the computer to enter a special processing state. When the user desires to access a remote database, the user types the special key, or key sequence (referred herein as a "keystroke"), followed by the file name or identifier of the remote data. A keyboard monitor detects the preselected keystroke, traps the applications command, and converts the entered data request to a remote data request which it communicates to the remote computer. When it receives back the data requested from the remote computer it files the data in the applications database, and modifies the file name in the user-entered command, terminating the interrupt and returning to the applications program. Thus, the user-entered command is processed by the applications program which retrieves the now resident data. In this manner, a single identified keystroke permits the user to access remote heterogeneous data using a normal command of the applications database and without exiting the applications program or entering additional information beyond the single keystroke preceding the normal command.

In a preferred embodiment, the method and device for accessing remote data files are implemented on a personal computer by modifying the keyboard monitor of the operating system to intercept user entries preceded by the preselected keystroke. The data accession program of the remote computer is modified to reformat retrieved data in the format of the PC applications program before transmission back to the PC, so that the PC resident portions of the program need no information as to where the requested data is located or what the host computer file structure is. This results in portable data accession software.

BRIEF DESCRIPTION OF THE DRAWINGS

These and other features of the invention will be understood with reference to the following description and the drawings, in which.

DETAILED DESCRIPTION OF THE DRAWINGS

Figure 1:
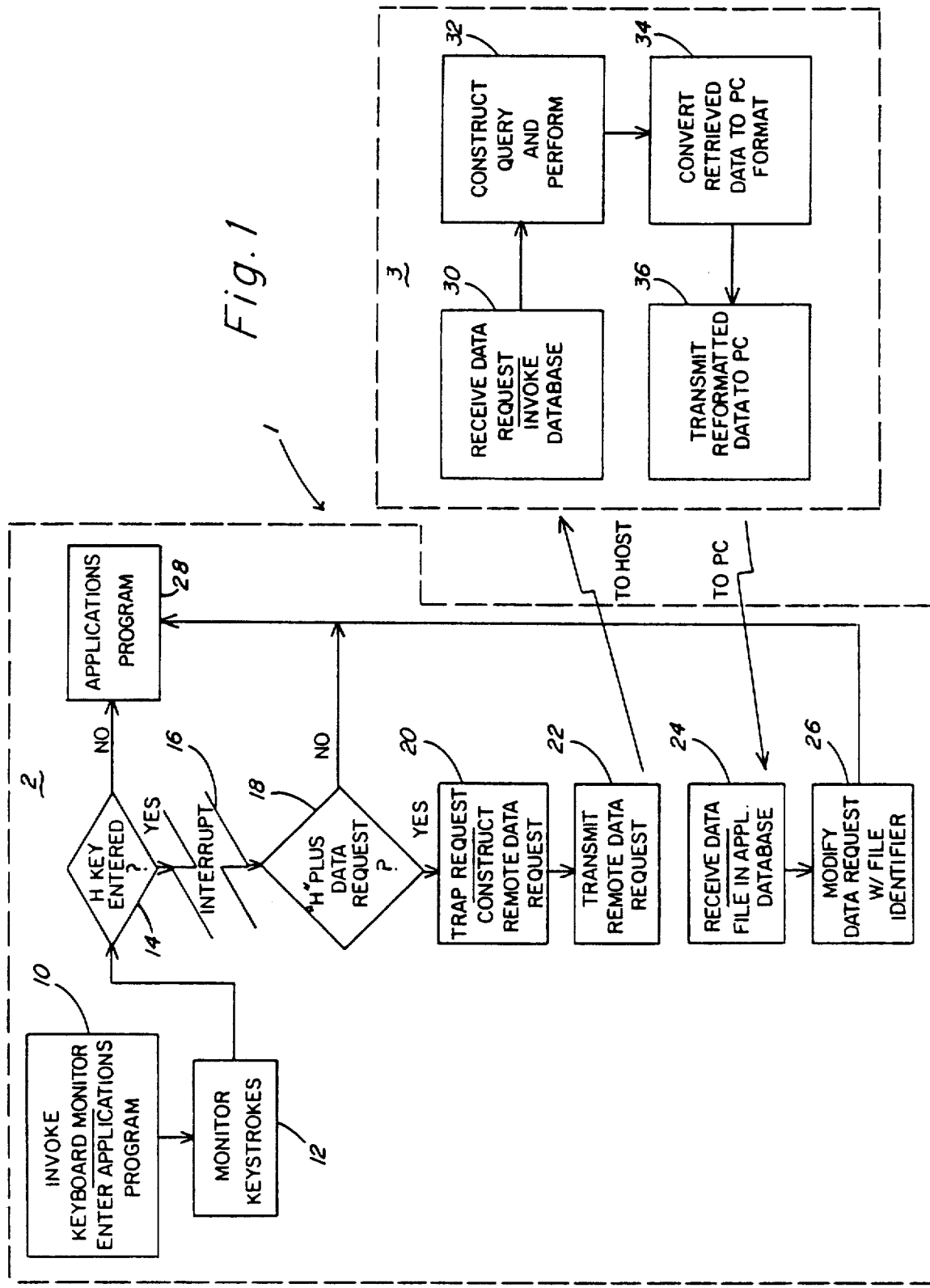
FIG. 1 shows a flow chart of the operation of a device according to one embodiment of the present invention.

FIG. 1 shows a system according to the invention for accessing remote data, and an ordered sequence of processing steps for effecting such accessing. As shown, the system includes a first series of processing steps 2 which are effected on a PC running an applications program, and a second series of processing steps 3 which are effected by a remote host which manages a distinct heterogeneous database. By way of illustration, processing 2 is performed on an IBM PC computer running the MS-DOS operating system, and processing 3 is performed on a 50 series minicomputer of the type manufactured by the Prime Computer Corporation of Natick, Mass. The implementation of the invention on the PC side is discussed with reference to the popular Lotus 1-2-3 program, the commands of which will be readily recognized; however, for purposes of the invention, it is only necessary that the applications program include keyboard entered commands which include data requests or requests for file retrieval. In Lotus, these are /DQ (file name, output field, field criteria) or /FR (file name).

The invention contemplates that a user operating a PC running an applications program requires data, which may be a file, or particular information or fields from a file, in a remote database. Accordingly, at a first step 10, the user brings up the PC, including its keyboard monitor subsystem, and enters the applications program, illustratively Lotus 1-2-3. Thereafter, the keyboard is monitored at 12, and each time keyboard data is entered, a determination is made at 14 whether a particular identified key denoted the "hot key" or "H" has been entered. If not, the entered keyboard command is passed directly to the applications program. If the "H" has been entered, however, an interrupt 16 is initiated to send the keyboard entry to a special processing branch.

In the special processing, the keyboard entry is inspected to determine whether it is of the form "H" plus a data request of the applications program. As noted above, the data request form of the Lotus program are /DQ for a data query for particular portions of an identified file, and /FR, to retrieve an entire file. If at step 18 the keyboard entered data is determined to not have this data request format, the interrupt terminates and control returns to the applications program to process the keyboard entry. Otherwise, that is, if the keyboard entry was a data request preceded by the "H" key, the request is trapped and a special request processing subroutine 20 constructs a request for remote data. At 22, the remote data request is transmitted to the remote host computer.

The transmitted remote data request initiates processing activity of the host computer in which, at 30 the host receives the request and invokes the appropriate database. The host computer at 32 then constructs a data query in its own format, and at 34 retrieves the requested data and converts it to the data format of the applications software of the personal computer. At 36, the retrieved reformatted data is transmitted from the host back to the PC.

At step 24 the PC receives the reformatted data and files it in the applications program database under an appropriately indexed file name. A data query rewrite subroutine 26 then modifies the original user-entered data request by deleting the "H" character, and by substituting the applications file name for the remote file name previously entered. This results in the formation of a command of the applications program which refers to a file which, following the foregoing processing, is resident in the applications database.

At this point 28 the interrupt is terminated and the program returns the modified data request to the keyboard buffer, whence it passes directly through to the applications program for execution.

In this manner, when the user enters the "H" key followed by an applications data request having remote data files as its argument, the remote data in a heterogeneous database is automatically accessed and brought into the applications file system without additional action on the part of the user.

In one prototype embodiment, the system has been implemented on an IBM PC computer running the MS-DOS operating system and communicating with a PRIME 9950 minicomputer running ORACLE or INFORMATION database management software. On the IBM PC, remote data accession is implemented by programming one preselected key (arbitrarily designated "H" above) to generate a keyboard interrupt vector which causes the operating system to jump to a special subroutine which effects the previously described request trapping, and construction of a remote data request. Attached hereto as Appendix A is a program written in "C" language which implements the critical subroutines depicted in 2 of FIG. 1. The attached program, Appendix A, includes two modules, denoted PARSEKBD.C and LOTUSGF.C. The correspondence between the described method steps 18, 20, 26, and the program modules are as follows:

18 ... PARSEKBD.C
20, 26 ... LOTUSGF.C

Parsekbd is called when the hot key has been depressed. It analyzes the keyboard request to recognize the type of request and to keep communications synchronized with operation of the applications program. Lotusgf reads the file name from the screen and accesses the host, receives the downloaded file, and modifies the keyboard buffer to instruct the applications program to access the file retrieved from the host.

Figure 2:
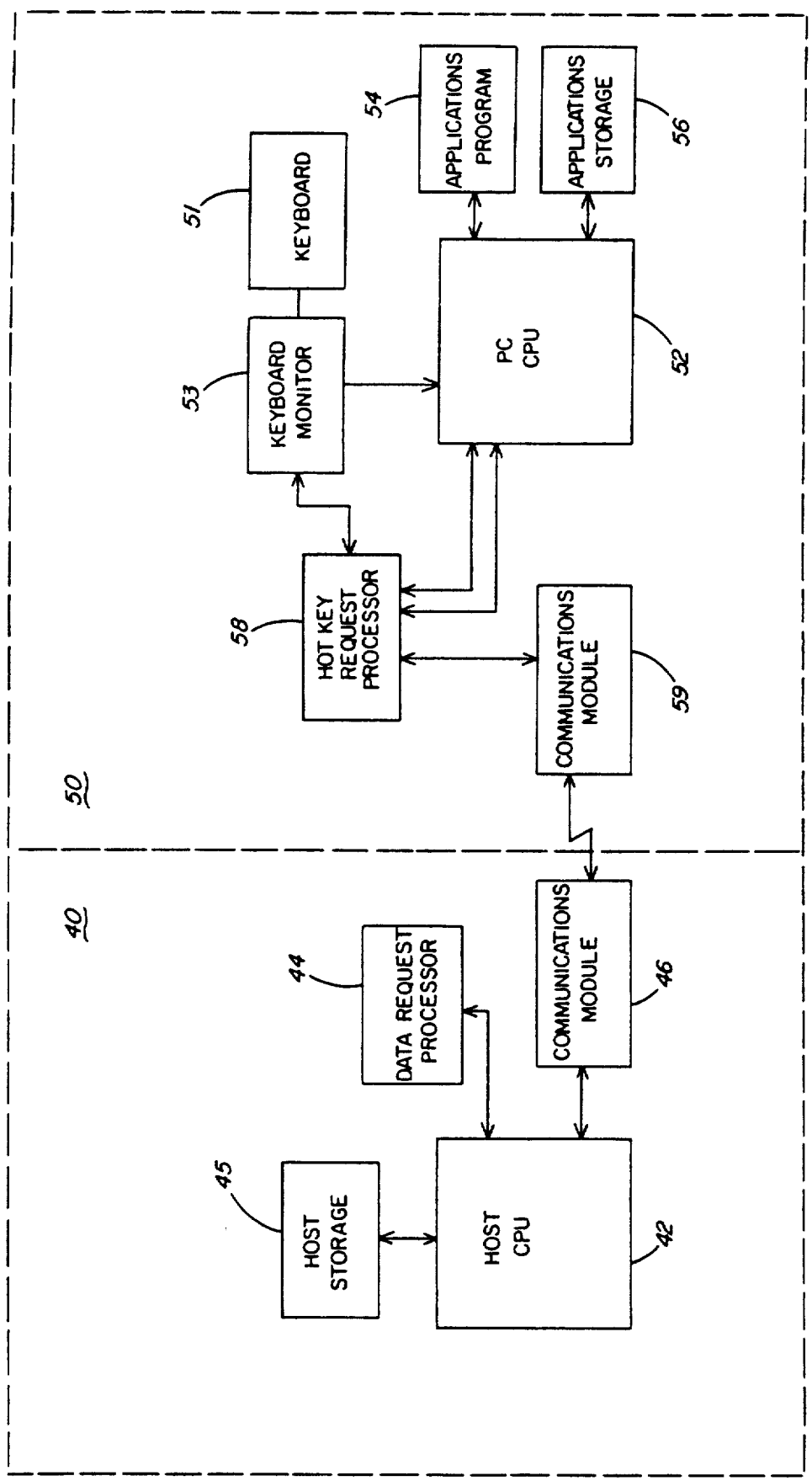
FIG. 2 shows a schematic diagram of components of a system as illustrated in FIG. 1.

FIG. 2 is a diagram of a system for performing the foregoing method. The system includes one or more PC systems 50 configured with applications programs, and an information processing remote host system 40. The remote host system comprises a CPU 42, a data request processor 44, host storage 45, and a communications device 46. A PC system includes a PC 52 running an applications program 54 and having applications data in applications storage 56, a keyboard 51 and keyboard monitor 53 for entry of data and commands, a hot key request processor 58 as previously described, and a communications device 59 for interfacing with the remote host.

It will be appreciated that the foregoing description of the invention is by way of illustration only and not of limitation. Thus, although the formatting of main frame and PC file information is described, and appears in Appendix A with particular reference to the formats of the particular programs described therein, the invention may readily be adapted to the accessing of other data from heterogeneous databases of other formats, while running PC applications programs made by other manufacturers. Similarly, the use of keyboard interrupt vectors and the modification of the PC operating system with a keyboard handling subroutine can be affected at higher levels in software using different programming techniques, without departing from the spirit of the invention. The invention being thus described, variations and modifications thereof will occur to those skilled in the art and all such variations and modifications are intended to be within the scope of the invention, as limited only by the following claims.

What is claimed is:

1. In a general purpose computer system including a first computer having at least a central processing unit and associated memory, a local applications database stored in files having a first file structure in the associated memory of the first computer, and a local applications program executing on the first computer for processing data stored in the local applications database, the local applications program being responsive to keyboard entered applications commands;
  a second host computer having at least a central processing unit and associated memory, said second host computer configured to access data stored in remote files in the associated memory of the second host computer;
  communications means for transmitting and receiving data and commands between the first computer and the second host computer;
  a method for importing remote file data to the first computer from the second host computer during execution of the applications program on the first computer, comprising the steps of:

providing a preselected command of the first computer indicating a request for remote data;

requesting remote data by actuating the preselected command in combination with an applications program data request command and a remote file identifier to initiate an interrupt;

translating, upon entry of the preselected command, the applications program data request command to a remote data request;

transmitting the remote data request to the second host computer;

receiving the remote data request by the second host computer;

converting the remote data request to a host computer data request command by the second host computer;

retrieving a requested data from the remote files of the second host computer;

converting, in the second host computer, the retrieved data to a format useful to the applications program;

transmitting the retrieved converted data to the first computer;

storing the converted data in the local applications database indexed by an applications file identifier and terminating the interrupt;

whereby the first computer responds to the preselected keystroke to import requested data from the second computer to the first computer and to process a data request for remote data while the applications program continues execution on the first computer so that the data accession is transparent to a user.

2. The method of claim 1 wherein the file structure of the files in the first computer is different from a file structure of the remote files on the second computer.

* * * * *